United States Patent
Chen

(10) Patent No.: US 10,832,425 B2
(45) Date of Patent: Nov. 10, 2020

(54) IMAGE REGISTRATION METHOD AND APPARATUS FOR TERMINAL, AND TERMINAL

(71) Applicant: Huawei Technologies Co., Ltd., Shenzhen (CN)

(72) Inventor: Gang Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 131 days.

(21) Appl. No.: 16/090,451

(22) PCT Filed: Mar. 30, 2016

(86) PCT No.: PCT/CN2016/077782
§ 371 (c)(1),
(2) Date: Oct. 1, 2018

(87) PCT Pub. No.: WO2017/166081
PCT Pub. Date: Oct. 5, 2017

(65) Prior Publication Data
US 2019/0114793 A1    Apr. 18, 2019

(51) Int. Cl.
*G06T 7/38* (2017.01)
*G06T 7/285* (2017.01)
(Continued)

(52) U.S. Cl.
CPC .......... *G06T 7/38* (2017.01); *G06T 7/223* (2017.01); *G06T 7/285* (2017.01);
(Continued)

(58) Field of Classification Search
CPC .......... G06T 7/38; G06T 7/285; G06T 7/223; G06T 2207/10021; H04N 19/573;
(Continued)

(56) References Cited

U.S. PATENT DOCUMENTS 6,507,661 B1  1/2003 Roy
7,672,378 B2 * 3/2010 Ng .................... H04N 19/597
                                                        348/36
(Continued)

FOREIGN PATENT DOCUMENTS

CN    103685951 A    3/2014
CN    103780840 A    5/2014
(Continued)

OTHER PUBLICATIONS

Machine Translation and Abstract of Chinese Publication No. CN103780840, May 7, 2014, 9 pages.
(Continued)

*Primary Examiner* — Ali Bayat
(74) *Attorney, Agent, or Firm* — Conley Rose, P.C.

(57) ABSTRACT

A method and an apparatus for a terminal, where the method includes obtaining a first video sequence photographed by a first camera and a second video sequence photographed by a second camera, determining, according to a first image in the first video sequence and photographed at a first moment and a second image in the second video sequence and photographed at the first moment, an available first motion vector (V), and a third image and a fourth image corresponding to the V, obtaining a second motion vector (U) of the first image relative to the third image, obtaining a third motion vector (W) of the fourth image relative to the second image, and obtaining a correspondence between a pixel in the first image and a pixel in the second image according to the V, the U, and the W.

20 Claims, 5 Drawing Sheets

(51) Int. Cl.
*H04N 19/597* (2014.01)
*H04N 19/573* (2014.01)
*H04N 13/239* (2018.01)
*H04N 19/537* (2014.01)
*H04N 5/232* (2006.01)
*H04N 13/246* (2018.01)
*H04N 17/00* (2006.01)
*G06T 7/223* (2017.01)
*H04N 13/204* (2018.01)
*H04N 13/00* (2018.01)

(52) U.S. Cl.
CPC ....... *H04N 5/23232* (2013.01); *H04N 13/204* (2018.05); *H04N 13/239* (2018.05); *H04N 13/246* (2018.05); *H04N 17/002* (2013.01); *H04N 19/537* (2014.11); *H04N 19/573* (2014.11); *H04N 19/597* (2014.11); *G06T 2207/10021* (2013.01); *H04N 2013/0085* (2013.01)

(58) Field of Classification Search
CPC .. H04N 19/597; H04N 19/537; H04N 13/204; H04N 13/246; H04N 13/239; H04N 5/23232; H04N 17/002; H04N 2013/0085
USPC .......................................................... 382/294
See application file for complete search history.

(56) References Cited

U.S. PATENT DOCUMENTS

| | | | |
|---|---|---|---|
| 8,854,432 | B2 | 10/2014 | Orimoto |
| 9,894,348 | B2* | 2/2018 | Beon .................. G06K 9/00697 |
| 10,447,926 | B1* | 10/2019 | Brailovskiy ....... H04N 5/23238 |
| 2001/0021224 | A1 | 9/2001 | Larkin et al. |
| 2004/0228409 | A1* | 11/2004 | Ryou .................. H04N 19/196 375/240.12 |
| 2008/0199043 | A1* | 8/2008 | Forsgren ............ A63B 24/0021 382/103 |
| 2010/0271498 | A1 | 10/2010 | Hwang et al. |
| 2010/0328436 | A1* | 12/2010 | Skubic ................. A61B 5/0205 348/47 |
| 2011/0069151 | A1 | 3/2011 | Orimoto |
| 2012/0019678 | A1 | 1/2012 | Fujita |
| 2013/0039595 | A1* | 2/2013 | Sumitomo ............. H04N 19/85 382/238 |
| 2015/0055873 | A1 | 2/2015 | Lee et al. |
| 2015/0338204 | A1* | 11/2015 | Richert .................. G06T 7/593 348/135 |
| 2016/0307300 | A1 | 10/2016 | Chen et al. |

FOREIGN PATENT DOCUMENTS

| | | |
|---|---|---|
| CN | 103888672 A | 6/2014 |
| CN | 103986875 A | 8/2014 |
| CN | 103996200 A | 8/2014 |
| CN | 104427211 A | 3/2015 |

OTHER PUBLICATIONS

Machine Translation and Abstract of Chinese Publication No. CN103888672, Jun. 25, 2014, 11 pages.
Machine Translation and Abstract of Chinese Publication No. CN103986875, Aug. 13, 2014, 18 pages.
Machine Translation and Abstract of Chinese Publication No. CN103996200, Aug. 20, 2014, 15 pages.
Foreign Communication From a Counterpart Application, PCT Application No. PCT/CN2016/077782, English Translation of International Search Report dated Dec. 28, 2016, 2 pages.
Foreign Communication From a Counterpart Application, PCT Application No. PCT/CN2016/077782, English Translation of Written Opinion dated Dec. 28, 2016, 6 pages.
Foreign Communication From a Counterpart Application, European Application No. 16895862.7, Extended European Search Report dated Feb. 27, 2019, 9 pages.

* cited by examiner

IMAGE REGISTRATION METHOD AND APPARATUS FOR TERMINAL, AND TERMINAL

CROSS-REFERENCE TO RELATED APPLICATIONS

This application is a U.S. National Stage of International Patent Application No. PCT/CN2016/077782 filed on Mar. 30, 2016, which is hereby incorporated by reference in its entirety.

TECHNICAL FIELD

The present invention relates to image processing technologies, and in particular, to an image registration method and apparatus for a terminal, and a terminal.

BACKGROUND

As a display technology improves, a user puts forward a higher requirement on quality of an image that is used as a display source. Because a relatively large sensor is provided on a high-end camera, a photographed image has relatively high quality. However, when the high-end camera is disposed on a mobile phone to improve image quality, a problem of a relatively thick mobile phone body usually arises due to the relatively large sensor in the high-end camera. As a result, it is inconvenient for the user to carry the mobile phone and user experience of handling is poor. To avoid the foregoing problem, more manufactures start to replace one high-end camera with two ordinary cameras, so as to improve image quality and implement more functions such as 3D image display, wide-angle photographing, noise reduction at night, and depth of field extension.

After two frames of images of a same scene are photographed by a mobile phone provided with dual cameras, image registration usually needs to be performed when the two frames of images is being processed, that is, two or more images of the same scene that are photographed at a same moment are aligned. Because the two cameras are usually disposed side by side, the two photographed frames of images have a parallax. After the two frames of images are aligned, the two frames of images may be combined according to features of different cameras, to obtain an image with higher quality or implement other functions.

In an existing image registration process, an optical flow algorithm or a block matching algorithm is usually used to align two frames of images. However, the two algorithms are relatively highly complex and have relatively low processing speeds. When a user uses a video camera or mobile phone with two cameras to photograph a video, a photographing speed is far higher than registration speeds of the two algorithms. As a result, a photographed image cannot be displayed to the user in real time.

SUMMARY

Embodiments of the present invention provide an image registration method and apparatus for a terminal, and a terminal, so as to overcome problems that an existing image registration method has a relatively low processing speed and cannot be applied to video photographing because an image processing result cannot be displayed to a user in real time.

According to a first aspect, an embodiment of the present invention provides an image registration method for a terminal, where the terminal includes a first camera and a second camera, and the first camera and the second camera are disposed side by side and work simultaneously; and the method includes:

obtaining a first video sequence photographed by the first camera and a second video sequence photographed by the second camera, where the first video sequence and the second video sequence record a same scene; determining, according to a first image that is in the first video sequence and that is photographed at a first moment and a second image that is in the second video sequence and that is photographed at the first moment, a first motion vector V available at the first moment and a third image and a fourth image that are corresponding to the first motion vector V, where the first motion vector V is a motion vector of the third image relative to the fourth image, the third image is an image that is in the first video sequence and that is photographed at a second moment, the fourth image is an image that is in the second video sequence and that is photographed at the second moment, and the second moment is a moment preceding the first moment; performing image registration processing on the first image and the third image to obtain a second motion vector U of the first image relative to the third image; obtaining a third motion vector W of the fourth image relative to the second image; and obtaining a registration result according to the first motion vector V, the second motion vector U, and the third motion vector W, where the registration result includes a correspondence between a pixel in the first image and a pixel in the second image.

According to the foregoing method, the result of registration between the two frames of current images is obtained according to the first motion vector V, the second motion vector U, and the third motion vector W. The first motion vector V is an obtained motion vector, and therefore, it does not take a processing time to obtain the first motion vector V. In addition, the second motion vector U and the third motion vector W are separately obtained by performing image registration on two frames of images that have no parallax and that are photographed at extremely close times, and therefore, there is a relatively high obtaining speed. In this way, real-time registration between the two frames of images may be implemented in a process in which a camera photographs a video, to provide reference for further processing of a next image. The image registration method according to this embodiment of this application may be applied to video photographing performed by the terminal including at least two cameras, and implement displaying a processed image to a user in real time.

With reference to the first aspect, in a first possible implementation of the first aspect, the process of obtaining a third motion vector W specifically includes:

performing image registration processing on the fourth image and the second image by using a global image registration algorithm, to obtain the third motion vector W of the fourth image relative to the second image, or performing inverse processing according to a movement direction included in the second motion vector U, to obtain the third motion vector W.

The third motion vector may be quickly obtained by performing inverse processing on the existing second motion vector, and an image registration speed may be further increased. Alternatively, the third motion vector is obtained by using the global image registration algorithm, and an image registration result with high accuracy may also be quickly obtained.

With reference to the first aspect or the first possible implementation of the first aspect, in a second possible implementation of the first aspect, the process of obtaining a registration result specifically includes:

performing, according to the first motion vector V, the second motion vector U, and the third motion vector W, displacement processing on a first location of each pixel in the first image, to obtain a second location; and obtaining the registration result according to the second location, where a pixel in the first location in the first image is corresponding to a pixel in the second location in the second image.

With reference to the first aspect, the first possible implementation of the first aspect, or the second possible implementation of the first aspect, in a third possible implementation of the first aspect, before the determining an available first motion vector V, the method further includes:

performing image registration processing on the third image and the fourth image by using a local image registration algorithm, to obtain the first motion vector V of the third image relative to the fourth image; and the process of obtaining a second motion vector U specifically includes:

performing image registration processing on the first image and the third image by using the global image registration algorithm, to obtain the second motion vector U of the first image relative to the third image.

Before the moment at which the first image and the second image are obtained, the first motion vector V is obtained by using the local image registration algorithm with relatively high accuracy. This ensures accuracy of the image registration result.

With reference to the third possible implementation of the first aspect, in a fourth possible implementation of the first aspect, the process of obtaining the first motion vector V specifically includes:

after it is determined that a process of image registration processing performed on a fifth image and a sixth image by using an optical flow algorithm or a block matching algorithm ends, performing, by using the optical flow algorithm or the block matching algorithm, image registration processing on a third image and a fourth image that are obtained at an end moment of the process of image registration processing, to obtain the first motion vector V of the third image relative to the fourth image, where the fifth image is an image that is in the first video sequence and that is photographed at a third moment, the sixth image is an image that is in the second video sequence and that is photographed at the third moment, and the third moment is a moment preceding the second moment.

After a first motion vector is generated each time, a generation process of a new first motion vector starts according to two frames of new images obtained at a generation moment, so that a currently available first motion vector obtained each time is a first motion vector that is generated most recently, thereby ensuring image registration accuracy.

With reference to any one of the first aspect, or the first to the third feasible implementations of the first aspect, in a fifth possible implementation of the first aspect, there are N frames of images within a time interval between obtaining the third image and the first image, and there are N frames of images within a time interval between obtaining the fourth image and the second image, where N is a positive integer.

With reference to the fifth possible implementation of the first aspect, in a sixth possible implementation of the first aspect, N is directly proportional to a photographing frame rate of a camera in the terminal.

The following describes an image registration apparatus for a terminal according to an embodiment of the present invention. The apparatus is corresponding to the method, is configured to implement the image registration method for the terminal in the foregoing embodiment, and has the same technical features and technical effects as those of the image registration method. Details are not described again in this embodiment of the present invention.

According to a second aspect, an embodiment of the present invention provides an image registration apparatus for a terminal, where the terminal includes a first camera and a second camera, and the first camera and the second camera are disposed side by side and work simultaneously; and the apparatus includes:

a video sequence obtaining module, configured to obtain a first video sequence photographed by the first camera and a second video sequence photographed by the second camera, where the first video sequence and the second video sequence record a same scene;

a currently available motion vector obtaining module, configured to determine, according to a first image that is in the first video sequence and that is photographed at a first moment and a second image that is in the second video sequence and that is photographed at the first moment, a first motion vector V available at the first moment and a third image and a fourth image that are corresponding to the first motion vector V, where the first motion vector V is a motion vector of the third image relative to the fourth image, the third image is an image that is in the first video sequence and that is photographed at a second moment, the fourth image is an image that is in the second video sequence and that is photographed at the second moment, and the second moment is a moment preceding the first moment;

a second motion vector generation module, configured to perform image registration processing on the first image and the third image to obtain a second motion vector U of the first image relative to the third image;

a third motion vector generation module, configured to obtain a third motion vector W of the fourth image relative to the second image; and a registration module, configured to obtain a registration result according to the first motion vector V, the second motion vector U, and the third motion vector W, where the registration result includes a correspondence between a pixel in the first image and a pixel in the second image.

With reference to the second aspect, in a first possible implementation of the second aspect, the third motion vector obtaining module is specifically configured to perform image registration processing on the fourth image and the second image by using a global image registration algorithm, to obtain the third motion vector W of the fourth image relative to the second image, or perform inverse processing according to a movement direction included in the second motion vector U, to obtain the third motion vector W.

With reference to the second aspect or the first possible implementation of the second aspect, in a second possible implementation of the second aspect, the registration module is specifically configured to: perform, according to the first motion vector V, the second motion vector U, and the third motion vector W, displacement processing on a first location of each pixel in the first image, to obtain a second location; and obtain the registration result according to the second location, where a pixel in the first location in the first image is corresponding to a pixel in the second location in the second image.

With reference to the second aspect, the first possible implementation of the second aspect, or the second possible implementation of the second aspect, in a third possible implementation of the second aspect, the apparatus further includes:

a first motion vector generation module, configured to perform image registration processing on the third image and the fourth image by using a local image registration algorithm, to obtain the first motion vector V of the third image relative to the fourth image, where the second motion vector generation module is specifically configured to perform image registration processing on the first image and the third image by using the global image registration algorithm, to obtain the second motion vector U of the first image relative to the third image.

With reference to the third possible implementation of the second aspect, in a fourth possible implementation of the second aspect, the first motion vector generation module is specifically configured to: after it is determined that a process of image registration processing performed on a fifth image and a sixth image by using an optical flow algorithm or a block matching algorithm ends, perform, by using the optical flow algorithm or the block matching algorithm, image registration processing on a third image and a fourth image that are obtained at an end moment of the process of image registration processing, to obtain the first motion vector V of the third image relative to the fourth image, where the fifth image is an image that is in the first video sequence and that is photographed at a third moment, the sixth image is an image that is in the second video sequence and that is photographed at the third moment, and the third moment is a moment preceding the second moment.

With reference to any one of the second aspect, or the first to the third feasible implementations of the second aspect, in a fifth possible implementation of the second aspect, there are N frames of images within a time interval between obtaining the third image and the first image, and there are N frames of images within a time interval between obtaining the fourth image and the second image, where N is a positive integer.

With reference to the fifth possible implementation of the second aspect, in a sixth possible implementation of the second aspect, N is directly proportional to a photographing frame rate of a camera in the terminal.

The following describes a terminal according to an embodiment of the present invention. The terminal is corresponding to the method, is configured to implement the image registration method for the terminal in the foregoing embodiment, and has the same technical features and technical effects as those of the image registration method. Details are not described again in this embodiment of the present invention.

According to a third aspect, an embodiment of the present invention provides a terminal, where the terminal includes a first camera, a second camera, and an image registration device, the first camera and the second camera are disposed side by side and work simultaneously, and the image registration device is specifically configured to: obtain a first video sequence photographed by the first camera and a second video sequence photographed by the second camera, where the first video sequence and the second video sequence record a same scene; determine, according to a first image that is in the first video sequence and that is photographed at a first moment and a second image that is in the second video sequence and that is photographed at the first moment, a first motion vector V available at the first moment and a third image and a fourth image that are corresponding to the first motion vector V, where the first motion vector V is a motion vector of the third image relative to the fourth image, the third image is an image that is in the first video sequence and that is photographed at a second moment, the fourth image is an image that is in the second video sequence and that is photographed at the second moment, and the second moment is a moment preceding the first moment; perform image registration processing on the first image and the third image to obtain a second motion vector U of the first image relative to the third image; obtain a third motion vector W of the fourth image relative to the second image; and obtain a registration result according to the first motion vector V, the second motion vector U, and the third motion vector W, where the registration result includes a correspondence between a pixel in the first image and a pixel in the second image.

With reference to the third aspect, in a first possible implementation of the third aspect, the image registration device is specifically configured to perform image registration processing on the fourth image and the second image by using a global image registration algorithm, to obtain the third motion vector W of the fourth image relative to the second image, or perform inverse processing according to a movement direction included in the second motion vector U, to obtain the third motion vector W.

With reference to the third aspect or the first possible implementation of the third aspect, in a second possible implementation of the third aspect, the image registration device is specifically configured to: perform, according to the first motion vector V, the second motion vector U, and the third motion vector W, displacement processing on a first location of each pixel in the first image, to obtain a second location; and obtain the registration result according to the second location, where a pixel in the first location in the first image is corresponding to a pixel in the second location in the second image.

With reference to the third aspect, the first possible implementation of the third aspect, or the second possible implementation of the third aspect, in a third possible implementation of the third aspect, the image registration device is further configured to perform image registration processing on the third image and the fourth image by using a local image registration algorithm, to obtain the first motion vector V of the third image relative to the fourth image; and the image registration device is specifically configured to perform image registration processing on the first image and the third image by using the global image registration algorithm, to obtain the second motion vector U of the first image relative to the third image.

With reference to the third possible implementation of the third aspect, in a fourth possible implementation of the third aspect, the image registration device is specifically configured to: after it is determined that a process of image registration processing performed on a fifth image and a sixth image by using an optical flow algorithm or a block matching algorithm ends, perform, by using the optical flow algorithm or the block matching algorithm, image registration processing on a third image and a fourth image that are obtained at an end moment of the process of image registration processing, to obtain the first motion vector V of the third image relative to the fourth image, where the fifth image is an image that is in the first video sequence and that is photographed at a third moment, the sixth image is an image that is in the second video sequence and that is photographed at the third moment, and the third moment is a moment preceding the second moment.

With reference to any one of the third aspect, or the first to the third feasible implementations of the third aspect, in a fifth possible implementation of the third aspect, there are N frames of images within a time interval between obtaining the third image and the first image, and there are N frames of images within a time interval between obtaining the fourth image and the second image, where N is a positive integer.

With reference to the fifth possible implementation of the third aspect, in a sixth possible implementation of the third aspect, N is directly proportional to a photographing frame rate of a camera in the terminal.

The following describes a storage medium according to an embodiment of the present invention. The storage medium is configured to implement the image registration method in any one of the first aspect, or the first to the sixth feasible implementations of the first aspect, and has the same technical features and technical effects as those of the image registration method. Details are not described again in the present invention.

According to a fourth aspect, an embodiment of the present invention provides a storage medium, where the storage medium is a computer readable storage medium and stores one or more programs, the one or more programs include an instruction, and when the instruction is executed by a portable electronic device that includes a camera and multiple application programs, the portable electronic device is enabled to execute the image registration method in any one of the first aspect, or the first to the sixth feasible implementations of the first aspect, where the camera includes a first camera and a second camera.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The embodiments of the present invention provide an image registration method for a terminal. Considering that a change in content of images obtained within a short time interval is relatively small, a result of registration between current images is used to provide reference for registration between next images, to increase an image registration speed. Therefore, simultaneous photographing by dual cameras can be applied to video photographing, to display a photographed image to a user in real time.

Figure 1:
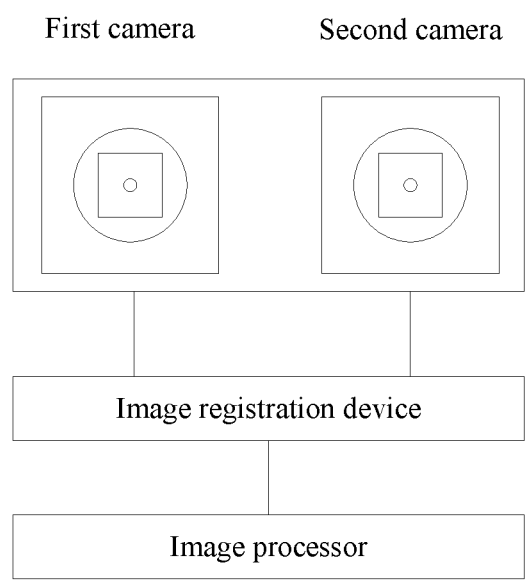
FIG. 1 is a schematic structural diagram of an embodiment of a terminal according to the embodiments of the present invention.

In the embodiments of the present invention, the terminal may be a video camera, a mobile phone, a tablet computer, or the like. A specific implementation form of the terminal is not particularly limited in the embodiments of the present invention. The terminal in the embodiments of the present invention includes at least a first camera and a second camera. The first camera and the second camera are disposed side by side, work simultaneously, and photograph a current scene at a same time, so as to obtain two frames of images and transmit the two frames of images to an image registration device. The image registration device processes the two frames of images in real time and outputs a registration result. An image processor subsequently performs image processing according to the registration result and displays a processed image. The first camera and the second camera may be exactly the same, or may be cameras with different features, for example, one color camera and one B/W camera. The image registration device and the image processor may also be integrated as one apparatus. FIG. 1 is a schematic structural diagram of an embodiment of a terminal according to the embodiments of the present invention. Specifically, as shown in FIG. 1, a first camera and a second camera are independent of each other, optical axes of the first camera and the second camera are parallel to each other, and the first camera and the second camera collect images at the same time. In this way, the terminal may photograph two video sequences of a same scene, send the two video sequences to an image registration device, and obtain a result of registration between the two video sequences. In actual use, the first camera and the second camera in the terminal may be set to working simultaneously, and then an image registration method for a terminal according to the present invention is applied, to obtain a registration result. Alternatively, the first camera or the second camera may be set to working separately, and a video photographed by a single camera is directly stored or output. The following provides detailed description for the image registration method for the terminal according to the embodiments of the present invention by using specific embodiments.

Figure 2:
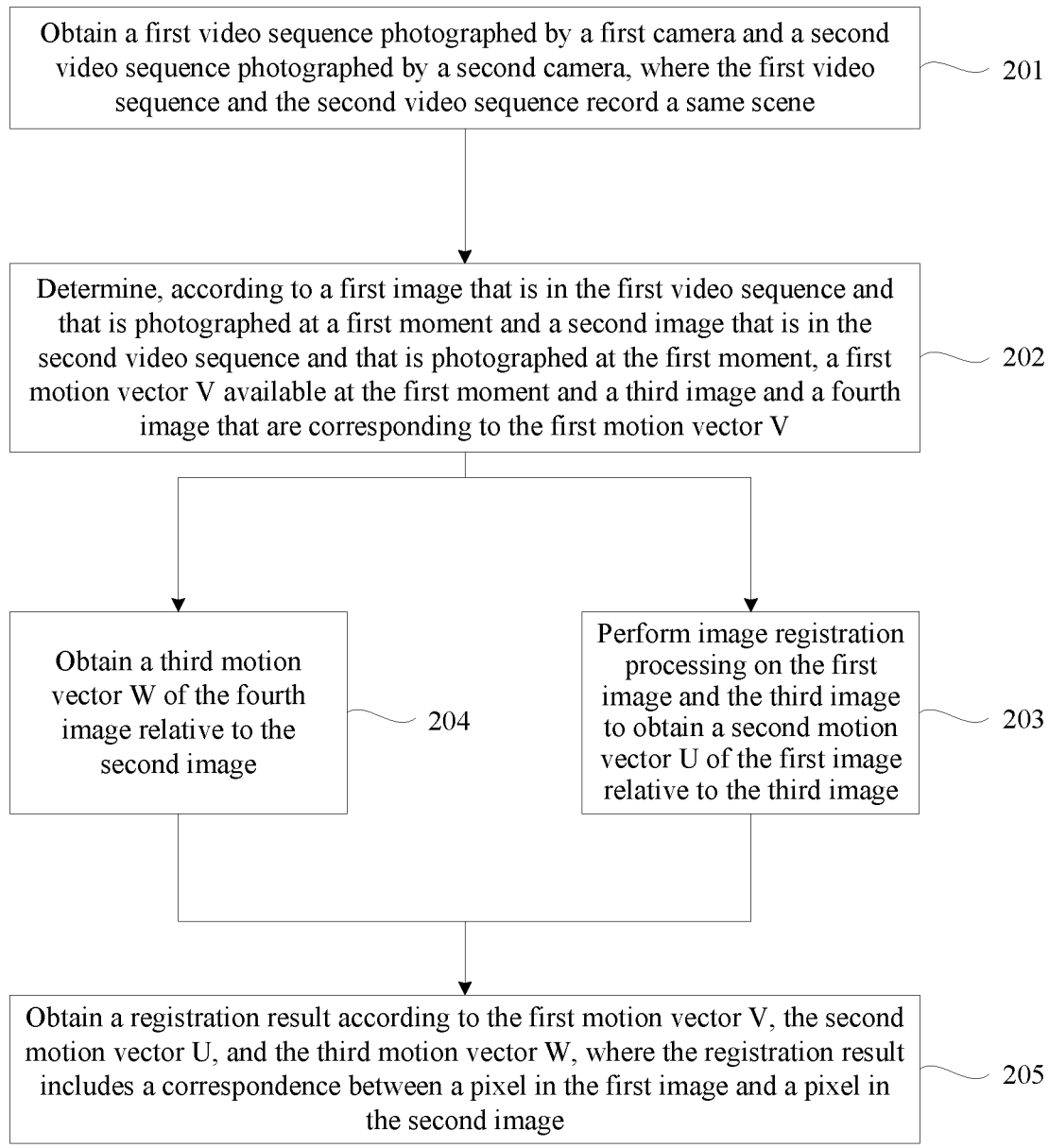
FIG. 2 is a schematic flowchart of Embodiment 1 of an image registration method for a terminal according to the embodiments of the present invention.

FIG. 2 is a schematic flowchart of Embodiment 1 of an image registration method for a terminal according to the present invention. The method is executed by an image registration apparatus. The apparatus may be implemented by software and/or hardware. For example, the apparatus may be the image registration device in FIG. 1. The image registration apparatus is disposed inside the terminal or integrated with a processor of the existing terminal. As shown in FIG. 2, the method includes the following steps.

Step 201. Obtain a first video sequence photographed by a first camera and a second video sequence photographed by a second camera, where the first video sequence and the second video sequence record a same scene.

Step 202. Determine, according to a first image that is in the first video sequence and that is photographed at a first moment and a second image that is in the second video sequence and that is photographed at the first moment, a first motion vector V available at the first moment and a third image and a fourth image that are corresponding to the first motion vector V.

The first motion vector V is a motion vector of the third image relative to the fourth image, the third image is an image that is in the first video sequence and that is photographed at a second moment, the fourth image is an image that is in the second video sequence and that is photographed at the second moment, and the second moment is a moment preceding the first moment.

Step 203. Perform image registration processing on the first image and the third image to obtain a second motion vector U of the first image relative to the third image.

Step 204. Obtain a third motion vector W of the fourth image relative to the second image.

Step 205. Obtain a registration result according to the first motion vector V, the second motion vector U, and the third motion vector W, where the registration result includes a correspondence between a pixel in the first image and a pixel in the second image.

Specifically, in step 201, when the terminal provided with at least two cameras performs photographing, a pair of images may be photographed by the first camera and the second camera at a same moment, and two video sequences may be continuously photographed. For example, a video sequence photographed by the first camera is marked as the first video sequence, a video sequence photographed by the second camera is marked as the second video sequence, and the first video sequence and the second video sequence record the same scene.

Figure 3:
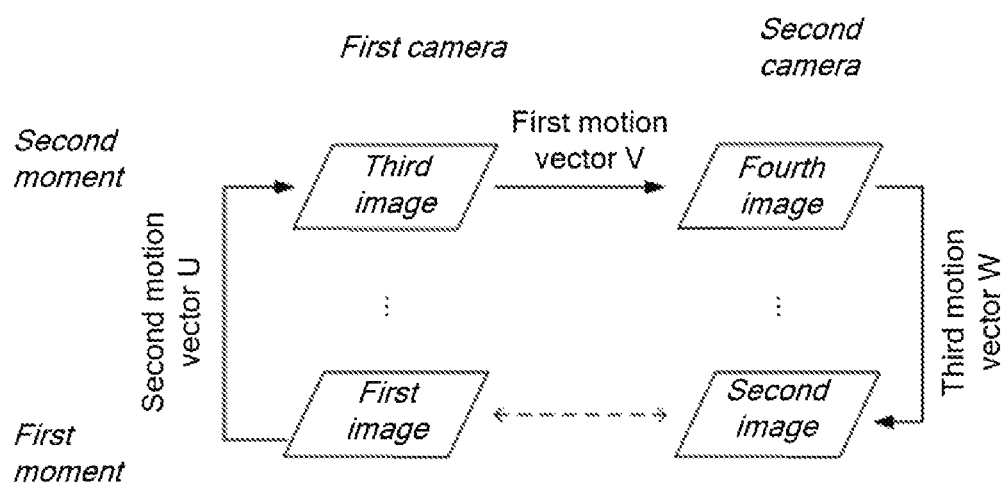
FIG. 3 is a schematic diagram of an application scenario of Embodiment 1 of an image registration method for a terminal according to the embodiments of the present invention.

Specifically, in step 202, the first motion vector V available at the first moment and the third image and the fourth image that are corresponding to the first motion vector V are determined according to the first image that is in the first video sequence and that is photographed the first moment and the second image that is in the second video sequence and that is also photographed at the first moment. The first motion vector V indicates a registration result obtained after image registration between the third image and the fourth image is performed. The registration result includes a one-to-one correspondence between a pixel in the third image and a pixel in the fourth image, and a motion vector may be obtained according to coordinates, in the images, of two pixels between which there is a correspondence. FIG. 3 is a schematic diagram of an application scenario of Embodiment 1 of the image registration method for the terminal according to the embodiments of the present invention. As shown in FIG. 3, the first motion vector V is the motion vector of the third image relative to the fourth image, and the third image and the fourth image are images obtained by the first camera and the second camera by simultaneously photographing the same scene at the second moment preceding the first moment. For example, there are N frames of images within a time interval between obtaining the third image and the first image, and there are N frames of images within a time interval between obtaining the fourth image and the second image, where N is a positive integer.

Specifically, when all the images have a same size and the images each include m×n pixels, the first motion vector V includes motion vectors of the m×n pixels, and a motion vector of each pixel includes a displacement size and a displacement direction. When a pixel in any location in the third image moves according to a motion vector that is in the first motion vector V and that is of the pixel in the location, the fourth image may be obtained, and the correspondence may be marked as T4=V(T3). Obviously, each pixel in the fourth image moves by reference to an inverse vector of the first motion vector V, that is, a first inverse vector $V^{-1}$, and the third image may be obtained, that is, T3=$V^{-1}$(T4).

Specifically, during obtaining the inverse vector, inverse processing is performed according to a movement direction corresponding to the first motion vector V, and the first inverse vector $V^{-1}$ may be obtained. For example, according to a motion vector (u,v) that is in the first motion vector V and that is of a pixel in any first location (x,y), the first location is moved according to the motion vector of the pixel, and a second location (p,q) may be obtained, where p=x+u, and q=y+v. A motion vector that is in the first inverse vector $V^{-1}$ and that is of a pixel in the second location (p,q) is (−u,−v), where u and v are integers, their values represent displacement sizes, and plus/minus signs of u and v represent displacement directions. m, n, x, y, p, and q are positive integers, and 0<x<m, 0<y<n, 0<p<m, and 0<q<n.

Because the first motion vector V is obtained according to the third image and the fourth image that are obtained before the first moment, the two frames of images have a parallax. Therefore, preferably, an image registration algorithm that is more suitable for registration operation processing of the two frames of images having the parallax and that has relatively high accuracy and a relatively low speed may be used to calculate the first motion vector V when the first moment arrives. For example, image registration processing may be performed on the third image and the fourth image by using a local image registration algorithm, to obtain the first motion vector V of the third image relative to the fourth image. Optionally, the local image registration algorithm may be an optical flow algorithm or a block matching algorithm with relatively high accuracy and a relatively low processing speed.

Specifically, in step 203, image registration processing is performed on the third image and the first image that are in the first video sequence photographed by the first camera, to obtain the second motion vector U of the first image relative to the third image, where the third image precedes the first image. When a pixel in any location in the first image moves according to a motion vector that is in the second motion vector U and that is of the pixel in the location, the third image may be obtained, and the correspondence may be marked as T3=U(T1). Obviously, T4=V(U(T1)).

Because a frame rate at which a video is photographed is relatively high, when two frames of images photographed by a same camera are obtained within a relatively short time interval and have no parallax, content of the two frames of images may be approximately considered to be completely identical, that is, it may be considered that the first image and the third image are extremely similar. When the two images are more similar, an image registration process is faster and a time consumed is shorter. Therefore, it can be ensured that in a process of photographing a video by the camera, a process of registration between a current image and a previous frame of image is completed while the current image that is newly photographed is received.

For example, the first image and the third image are photographed by the same camera, are obtained within only a short time interval, and may be appropriately considered to have no parallax. In this case, image registration processing may be performed on the first image and the third image by using a global image registration algorithm, to obtain the second motion vector U of the first image relative to the third image. A processing speed of the global image registration algorithm is higher than that of the local image registration algorithm. Therefore, a computation amount in an image registration process can be reduced, and a speed of the image registration process can be increased. For example, image registration processing may be performed on the first image and the third image by using the global image registration algorithm with a relatively high processing speed and relatively high accuracy, to obtain the second motion vector U of the first image relative to the third image. The global image registration algorithm includes a homography matrix method based on feature point matching, a registration method based on histogram matching, and the like. If the global image registration algorithm is directly applied to image registration performed on the third image and the fourth image that have a parallax, because the two frames of images have the parallax, there is a problem of relatively low accuracy although a registration speed is increased. Therefore, an accurate result of image registration performed on the third image and the fourth image cannot be directly obtained by using the global image registration algorithm.

Specifically, in step 204, the third motion vector W of the fourth image relative to the second image are obtained, where the fourth image and the second image are in the second video sequence photographed by the second camera and the fourth image precedes the second image. When a pixel in any location in the fourth image moves according to a motion vector that is in the third motion vector W and that is of the pixel in the location, the second image may be obtained. The correspondence may be marked as T2=W (T4). Obviously, T2=W(V(U(T1))).

Optionally, when the third motion vector W is obtained, the following feasible implementations are included:

A feasible implementation is:

performing image registration processing on the fourth image and the second image to obtain the third motion vector W of the fourth image relative to the second image.

For example, the following case is similar to the case of the first image and the third image, because a frame rate at which a video is photographed is relatively high, when two frames of images photographed by a same camera are obtained within a relatively short time interval and have no parallax, content of the two frames of images may be approximately considered to be completely identical, that is, it may be considered that the second image and the fourth image are extremely similar. When the two images are more similar, an image registration process is faster and a time consumed is shorter. Therefore, it can be ensured that in a process of photographing a video by the camera, a process of registration between a current image and a previous frame of image is completed while the current image that is newly photographed is received.

For example, image registration processing may also be performed on the fourth image and the second image by using the global image registration algorithm, to obtain the third motion vector W of the fourth image relative to the second image. The processing speed of the global image registration algorithm is higher than that of the local image registration algorithm. For example, image registration processing may be performed on the second image and the fourth image by using the global image registration algorithm with a relatively high processing speed and relatively high accuracy, to obtain the third motion vector W of the fourth image relative to the second image. The global image registration algorithm includes a homography matrix method based on feature point matching, a registration method based on histogram matching, and the like.

With this implementation, step 203 and step 204 may be executed simultaneously, and there is no time sequence of execution.

Another feasible implementation is:

performing inverse processing according to a movement direction included in the second motion vector U to obtain the third motion vector W.

For example, because the first camera and the second camera are disposed side by side and photograph the same scene at a same moment, it may be considered that content of images in the two video sequences photographed by the first camera and the second camera has a same movement rule, that is, the third image may be obtained by changing the first image according to the second motion vector U. Correspondingly, the fourth image may be obtained by changing the second image according to the second motion vector U. Therefore, the third motion vector W of the fourth image relative to the second image may be considered as an inverse vector $U^{-1}$ of the second motion vector U. Specifically, an obtaining method of the inverse vector $U^{-1}$ is the same as that of the first inverse vector $V^{-1}$, and details are not described again.

For example, the second motion vector U and the third motion vector W each include motion vectors of m×n pixels, and a motion vector of each pixel is obtained, according to a 3×3 homography matrix and coordinates of the pixel in a respective image, in the image registration process in which the global image registration algorithm is used.

Specifically, in step 205, it may be learned according to the foregoing formula T2=W(V(U(T1))) that a result of registration between the first image and the second image may be obtained according to the first motion vector V, the second motion vector U, and the third motion vector W. The registration result includes the correspondence between a pixel in the first image and a pixel in the second image.

For example, displacement processing is performed, according to the first motion vector V, the second motion vector U, and the third motion vector W, on a first location of each pixel in the first image, and a second location is obtained.

The registration result is obtained according to the second location. A pixel in the first location in the first image is corresponding to a pixel in the second location in the second image.

Specifically, the pixel in the first location in the first image is used as an example. Coordinates of the pixel in the first location are first coordinates, and the first coordinates are moved according to a motion vector that is in the first motion vector V and that is of the pixel with the first coordinates, to obtain second coordinates; the second coordinates are moved according to a motion vector that is in the second motion vector U and that is of a pixel with the second coordinates, to obtain third coordinates; the third coordinates are moved according to a motion vector that is in the third motion vector W and that is of a pixel with the third coordinates, to obtain fourth coordinates, and a location of the fourth coordinates in the second image is marked as the second location; and the registration result may be obtained according to the second location, that is, the pixel in the first location (that is, the first coordinates) in the first image is corresponding to the pixel in the second location (that is, the fourth coordinates) in the second image.

According to the image registration method for the terminal provided in this embodiment of the present invention, the result of registration between the two frames of current images is obtained according to the first motion vector V, the second motion vector U, and the third motion vector W. The first motion vector V with relatively high accuracy is an obtained motion vector, and therefore, it does not take a processing time to obtain the first motion vector V. In addition, the second motion vector U and the third motion vector W are separately obtained by performing image registration on two frames of extremely similar images, and therefore, there is a relatively high obtaining speed. In the process of photographing a video by the camera, the second motion vector U and the third motion vector W that are of the two frames of current images may be obtained simultaneously when the two frames of current images are updated. Therefore, according to this embodiment of the present invention, an image registration speed is increased, and real-time registration between the two frames of images may be implemented under a condition that image registration accuracy is not reduced, to provide reference for further processing of a next image. In this way, the terminal including at least two cameras can be applied to video photographing, so as to display a photographed image to a user in real time.

Further, based on the foregoing embodiment, the first motion vector V is updated, to increase image registration accuracy. Specifically, before step 202, this embodiment of the present invention further includes:

after it is determined that a process of image registration processing performed on a fifth image and a sixth image by using an optical flow algorithm or a block matching algorithm ends, performing, by using the optical flow algorithm or the block matching algorithm, image registration processing on a third image and a fourth image that are obtained at an end moment of the process of image registration processing, to obtain the first motion vector V of the third image relative to the fourth image.

The fifth image is an image that is in the first video sequence and that is photographed at a third moment, the sixth image is an image that is in the second video sequence and that is photographed at the third moment, and the third moment is a moment preceding the second moment.

Figure 4:
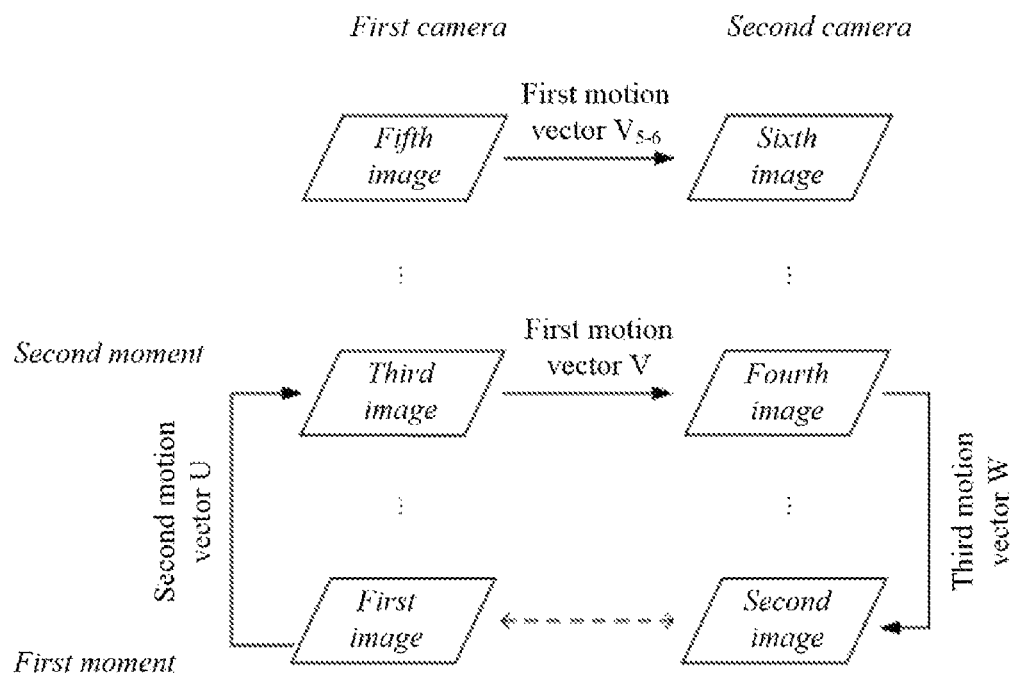
FIG. 4 is a schematic diagram of an application scenario of Embodiment 2 of an image registration method for a terminal according to the embodiments of the present invention.

For example, FIG. 4 is a schematic diagram of an application scenario of Embodiment 2 of an image registration method for a terminal according to the embodiments of the present invention. As shown in FIG. 4, a fifth image, a third image, and a first image are photographed by a first camera in a time sequence; a sixth image, a fourth image, and a second image are photographed by a second camera in a time sequence; and there is another image between images photographed by a same camera. When the fifth image and the sixth image are a first frame of image photographed by the first camera and a first frame of image photographed by the second camera, respectively, image registration processing is immediately performed on the fifth image and the sixth image by using an optical flow algorithm or a block matching algorithm. When registration processing ends, a motion vector of the fifth image relative to the sixth image is obtained and marked as a first motion vector $V_{5-6}$. At the same time, at an end moment of a process of registration processing performed on the fifth image and the sixth image, image registration processing is performed, by using the optical flow algorithm or the block matching algorithm, on two frames of images photographed by the first camera and the second camera. In an example in which the end moment is just the second moment in the foregoing embodiment, image registration processing is performed on the obtained third image and fourth image by using the optical flow algorithm or the block matching algorithm. For images obtained after the second moment, image registration may be performed based on the first motion vector $V_{5-6}$ and by using the method in the foregoing embodiment. For images that are photographed by the first camera and the second camera before the first motion vector $V_{5-6}$ is obtained, one of two images may be selected to be output. Similarly, a first motion vector V of the third image relative to the fourth image is obtained when registration processing performed on the third image and the fourth image ends; image registration processing is performed, at an end moment of a process of registration processing performed on the third image and the fourth image and by using the optical flow algorithm or the block matching algorithm, on two frames of images photographed by the first camera and the second camera; and in an example in which the end moment is just the first moment in the foregoing embodiment, image registration processing is performed on the obtained first image and second image by using the optical flow algorithm or the block matching algorithm. For images obtained after the first moment, image registration may be performed based on the first motion vector V and by using the method in the foregoing embodiment.

Figure 5:
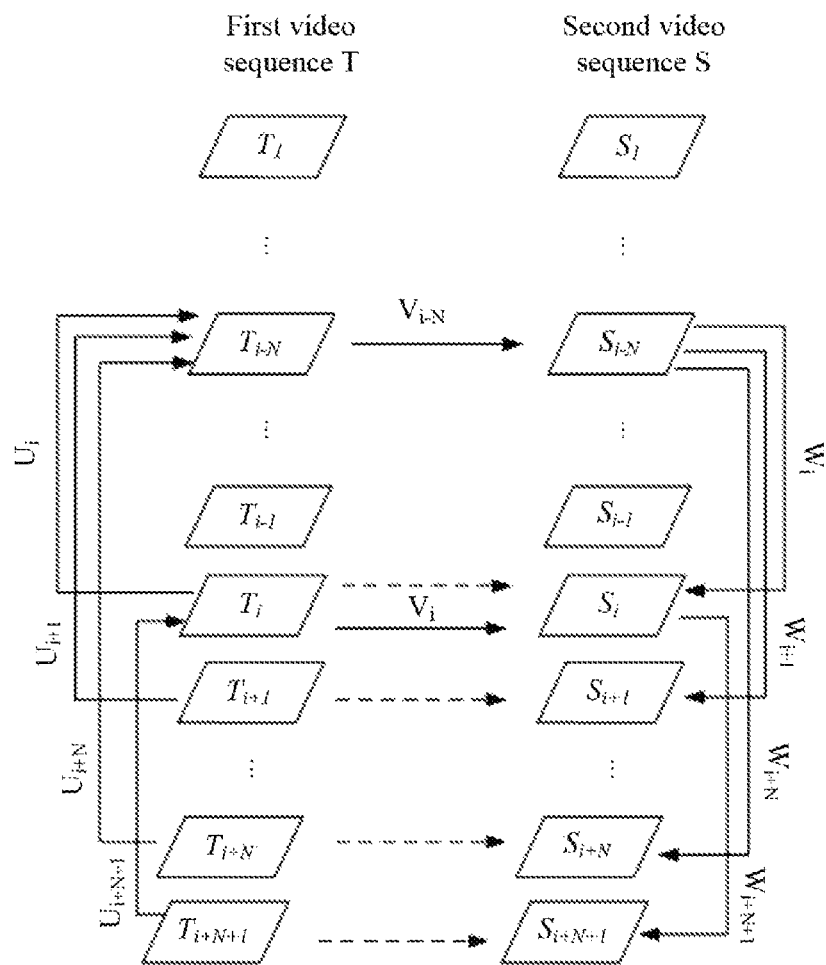
FIG. 5 is a schematic diagram of an application scenario of Embodiment 3 of an image registration method for a terminal according to the embodiments of the present invention.

The following details, with reference to FIG. 5, an update process of a first motion vector V in an image registration method for a terminal according to the present invention by using two video sequences, that is, a first video sequence T and a second video sequence S, photographed by a first camera and a second camera as an example. FIG. 5 is a schematic diagram of an application scenario of Embodiment 3 of an image registration method for a terminal according to the embodiments of the present invention.

As shown in FIG. 5, the first video sequence T is photographed by the first camera and includes images $\{T_1, T_2, \ldots, T_{i-N}, \ldots, T_{i-1}, T_i, T_{i+1}, \ldots, T_{i+N} \ldots \}$ in a time sequence, and the second video sequence S is photographed by the second camera and includes images $\{S_1, S_2, \ldots, S_{i-N}, \ldots, S_{i-1}, S_i, S_{i+1}, \ldots, S_{i+N} \ldots \}$ in a time sequence. $T_i$ and $S_i$ are photographed at a same moment, where i and N are positive integers, and i−N>1.

First, according to the image $T_i$ (that is, the first image in the foregoing embodiments) and the image $S_i$ (that is, the second image in the foregoing embodiments) that are photographed at an $i^{th}$ moment, it is determined that a currently available motion vector is a first motion vector $V_{i-N}$, which is shown by an arrowed solid line $V_{i-N}$ between the image $T_i$ and the image $S_i$ in FIG. 5, and two frames of images, that is the image $T_{i-N}$ (that is, the third image in the foregoing embodiments) and the image $S_{i-N}$ (that is, the fourth image in the foregoing embodiments) that are corresponding to the first motion vector $V_{i-N}$ are determined. Each pixel in the image $T_{i-N}$ moves by reference to the first motion vector $V_{i-N}$, the image $S_{i-N}$ may be obtained, and the correspondence may be marked as $S_{i-N}=V_{i-N}(T_{i-N})$.

Second, a second motion vector $U_i$ of the image $T_i$ relative to the image $T_{i-N}$ is obtained. A specific obtaining method may be the same as those in the foregoing embodiments, and details are not described again. Each pixel in the image $T_i$ moves by reference to the second motion vector $U_i$, the image $T_{i-N}$ may be obtained, the correspondence may be marked as $T_{i-N}=U_i(T_i)$, and $S_{i-N}=V_{i-N}(U_i(T_i))$ may be derived.

Third, a third motion vector $W_i$ of the image $S_i$ relative to the image $S_{i-N}$ is obtained. A specific obtaining method may be the same as those in the foregoing embodiments, and details are not described again. Each pixel in the image $S_{i-N}$ moves by reference to the third motion vector $W_i$, the image $S_{i-N}$ may be obtained, the correspondence may be marked as $S_i=W_i(S_{i-N})$, and $S_i=W_i(V_{i-N}(U_i(T_i)))$ may be derived.

Finally, it can be learned according to the correspondence $S_i=W_i(V_{i-N}(U_i(T_i)))$ that the image $S_i$ may be obtained by successively moving the pixels in the image $T_i$ according to the second motion vector $U_1$, the first motion vector $V_{i-N}$, and the third motion vector $W_1$. In this case, a result of registration between the pixels in the image $T_i$ and pixels in the image $S_i$ may be obtained, which is shown by an arrowed dash line between the image $T_i$ and the image $S_i$ in FIG. 5.

After the result of registration between the image $T_i$ and the image $S_i$ that are photographed at the $i^{th}$ moment is obtained, image registration is performed on the image $T_{i+1}$ and the image $S_{i+1}$ that are photographed at an $(i+1)^{th}$ moment following the $i^{th}$ moment.

Similarly, a currently available motion vector is first obtained and still the first motion vector $V_{i-N}$, and in this case, it may be determined that two frames of images corresponding to the first motion vector $V_{i-N}$ are still the image $T_{i-N}$ and the image $S_{i-N}$; then, a second motion vector $U_{i+1}$ of the image $T_{i+1}$ relative to the image $T_{i-N}$ and a third motion vector $W_{i+1}$ of the image $S_{i+1}$ relative to the image $S_{i-N}$ are obtained by using the image $T_{i-N}$ and the image $S_{i-N}$ as reference again; and finally, the image $S_{i+1}$ may be obtained by successively moving pixels in the image $T_{i+1}$ according to the second motion vector $U_{i+1}$, the first motion vector $V_{i-N}$, and the third motion vector $W_{1+1}$. Further, a result of registration between the pixels in the image $T_{i+1}$ and pixels in the image $S_{i+1}$ may be obtained, which is shown by an arrowed dash line between the image $T_{i+1}$ and the image $S_{i+1}$ in FIG. 5.

Similarly, image registration is performed, by using the same first motion vector $V_{i-N}$ and the image $T_{i-N}$ and the image $S_{i-N}$ that are corresponding to the first motion vector $V_{i-N}$, on two frames of images photographed from the $(i+1)^{th}$ moment to an $(i+N)^{th}$ moment.

However, for an image $T_{i+N+1}$ and an image $S_{i+N+1}$ that are photographed at an $(i+N+1)^{th}$ moment, at the $(i+N+1)^{th}$ moment, the currently available first motion vector $V_{i-N}$ has been updated to a first motion vector $V_i$, which is shown by an arrowed solid line $V_i$ between the image $T_{i+N+1}$ and the image $S_{i+N+1}$ in FIG. 5. It may be determined that two frames of images corresponding to the first motion vector $V_i$ are the image $T_i$ and the image $S_i$, respectively. Then, a second motion vector $U_{i+N+1}$ of the image $T_{i+N+1}$ relative to the image $T_i$ and a third motion vector $W_{i+N+1}$ of the image $S_{i+N+1}$ relative to the image $S_i$ are obtained by using the image $T_i$ and the image $S_i$ as reference. Finally, a result of registration between the image $T_{i+N+1}$ and the image $S_{i+N+1}$ may be obtained according to the second motion vector $U_{i+N+1}$, the first motion vector $V_i$, and the third motion vector $W_{i+N+1}$.

Specifically, because image registration processing is performed by using an optical flow algorithm or a block matching algorithm, to obtain the first motion vector, a large computation amount is caused, the registration result has high accuracy, but the registration result is generated at a low speed. Therefore, multiple frames of images are obtained each time the first motion vector is updated. Optionally, as described above, the following may be set: Image registration is automatically performed on two frames of new images that are currently photographed after a first motion vector is generated, and after registration is completed, the first motion vector is automatically updated and a next first motion vector starts to be calculated. Therefore, quantities of images existing within each time interval between obtaining two frames of images may be different or the same.

Optionally, the following may be set: A first motion vector is calculated once each time a fixed quantity of images are photographed. That is, there are N frames of images within a time interval between obtaining a fifth image and a third image and between the third image and a first image, and there are N frames of images within a time interval between obtaining a sixth image and a fourth image and between the fourth image and a second image. When N is smaller, a used first motion vector is updated faster and a registration result is more accurate. When N is larger, a registration result is less accurate. Therefore, a quantity of frames of images within a time interval between obtaining images used to generate a first motion vector by using the optical flow algorithm or the block matching algorithm is set to N.

Optionally, N is directly proportional to a photographing frame rate of a camera in the terminal.

For example, when the photographing frame rate of the camera is higher, there are more images photographed by the camera each second. However, an update time of a first motion vector is constant. As a result, when the photographing frame rate is higher, more images have to use a same first motion vector, that is, a quantity N of images between the first image and the third image is larger. In an actual use process, preferably, N is 10.

Figure 6:
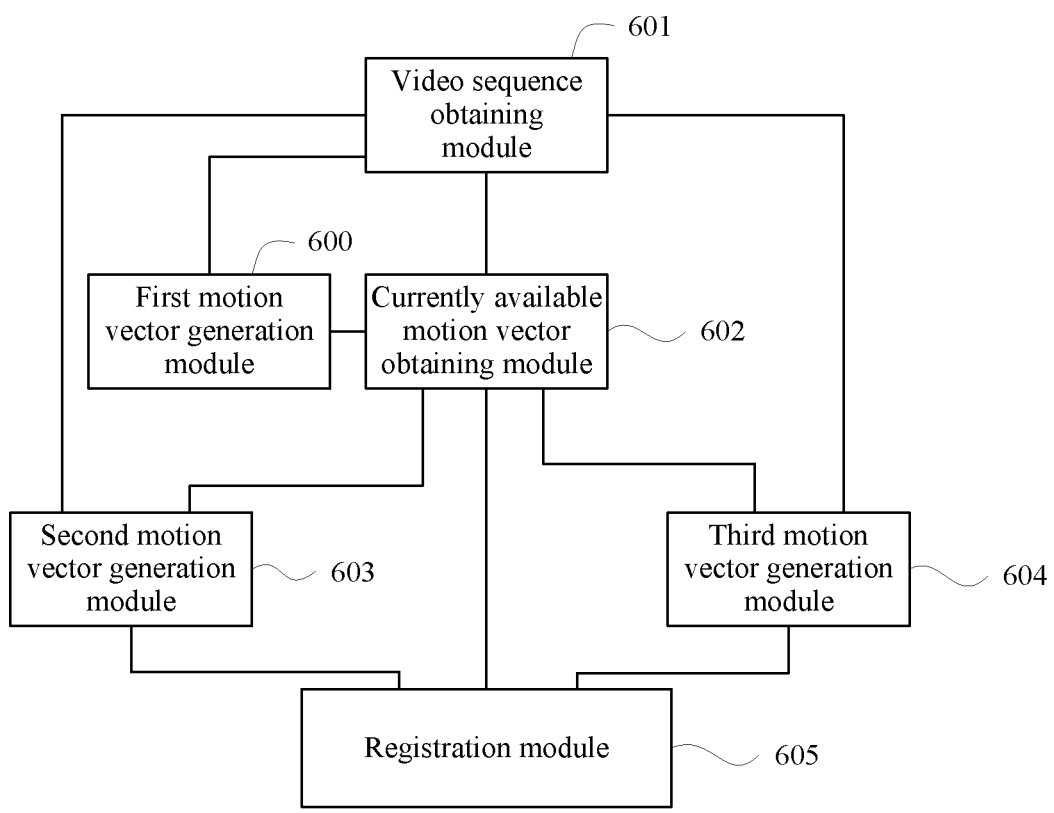
FIG. 6 is a schematic structural diagram of Embodiment 1 of an image registration device for a terminal according to the embodiments of the present invention.

Another aspect of the embodiments of the present invention provides an image registration apparatus for a terminal. The terminal includes a first camera and a second camera, and the first camera and the second camera are disposed side by side and work simultaneously. The apparatus may execute the image registration method in any one of the foregoing embodiments, implementation principles and technical effects thereof are similar to those of the image registration method in any one of the foregoing embodiments, and details are not described herein again. FIG. 6 is a schematic structural diagram of Embodiment 1 of an image registration device for a terminal according to the embodiments of the present invention. As shown in FIG. 6, the apparatus includes:

a video sequence obtaining module 601, configured to obtain a first video sequence photographed by a first camera and a second video sequence photographed by a second camera, where the first video sequence and the second video sequence record a same scene;

a currently available motion vector obtaining module 602, configured to determine, according to a first image that is in the first video sequence and that is photographed at a first moment and a second image that is in the second video sequence and that is photographed at the first moment, a first motion vector V available at the first moment and a third image and a fourth image that are corresponding to the first motion vector V, where the first motion vector V is a motion vector of the third image relative to the fourth image, the third image is an image that is in the first video sequence and that is photographed at a second moment, the fourth image is an image that is in the second video sequence and that is photographed at the second moment, and the second moment is a moment preceding the first moment;

a second motion vector generation module 603, configured to perform image registration processing on the first image and the third image to obtain a second motion vector U of the first image relative to the third image;

a third motion vector generation module 604, configured to obtain a third motion vector W of the fourth image relative to the second image; and a registration module 605, configured to obtain a registration result according to the first motion vector V, the second motion vector U, and the third motion vector W, where the registration result includes a correspondence between a pixel in the first image and a pixel in the second image.

According to the image registration apparatus for the terminal provided in this embodiment of the present invention, the registration module obtains the result of registration between the two frames of current images according to the first motion vector V, the second motion vector U, and the third motion vector W. The first motion vector V with relatively high accuracy is an obtained motion vector, and therefore, it does not take a processing time to obtain the first motion vector V. In addition, the second motion vector U and the third motion vector W are separately obtained by performing image registration on two frames of extremely similar images, and therefore, there is a relatively high obtaining speed. In a process in which the camera photographs a video, the second motion vector U and the third motion vector W that are of the two frames of current images may be obtained simultaneously when the two frames of current images are updated. Therefore, according to this embodiment of the present invention, an image registration speed is increased, and real-time registration between the two frames of images may be implemented under a condition that image registration accuracy is not reduced, to provide reference for further processing of a next image. In this way, the terminal including at least two cameras can be applied to video photographing, so as to display a photographed image to a user in real time.

Optionally, the third motion vector obtaining module 604 is specifically configured to perform image registration processing on the fourth image and the second image by using a global image registration algorithm, to obtain the third motion vector W of the fourth image relative to the second image, or perform inverse processing according to a movement direction included in the second motion vector U, to obtain the third motion vector W.

Optionally, the registration module 605 is specifically configured to: perform, according to the first motion vector V, the second motion vector U, and the third motion vector W, displacement processing on a first location of each pixel in the first image, to obtain a second location; and obtain the registration result according to the second location, where a pixel in the first location in the first image is corresponding to a pixel in the second location in the second image.

Optionally, the apparatus further includes a first motion vector generation module 600, configured to perform image registration processing on the third image and the fourth image by using a local image registration algorithm, to obtain the first motion vector V of the third image relative to the fourth image.

Further, the second motion vector generation module 603 is specifically configured to perform image registration processing on the first image and the third image by using the global image registration algorithm, to obtain the second motion vector U of the first image relative to the third image.

Optionally, the first motion vector generation module 600 is specifically configured to: after it is determined that a process of image registration processing performed on a fifth image and a sixth image by using an optical flow algorithm or a block matching algorithm ends, perform, by using the optical flow algorithm or the block matching algorithm, image registration processing on a third image and a fourth image that are obtained at an end moment of the process of image registration processing, to obtain the first motion vector V of the third image relative to the fourth image.

The fifth image is an image that is in the first video sequence and that is photographed at a third moment, the sixth image is an image that is in the second video sequence and that is photographed at the third moment, and the third moment is a moment preceding the second moment.

Optionally, there are N frames of images within a time interval between obtaining the third image and the first image, and there are N frames of images within a time interval between obtaining the fourth image and the second image, where N is a positive integer.

Optionally, N is directly proportional to a photographing frame rate of a camera in the terminal.

Another aspect of the embodiments of the present invention further provides a terminal, including a first camera, a second camera, and an image registration device, where the first camera and the second camera are disposed side by side and work simultaneously. The terminal is configured to execute the image registration methods in the foregoing method embodiments, implementation principles and technical effects thereof are similar to those of the image registration methods in the foregoing method embodiments, and details are not described herein again.

The image registration device for the terminal is specifically configured to:

obtain a first video sequence photographed by the first camera and a second video sequence photographed by the second camera, where the first video sequence and the second video sequence record a same scene;

determine, according to a first image that is in the first video sequence and that is photographed at a first moment and a second image that is in the second video sequence and that is photographed at the first moment, a first motion vector V available at the first moment and a third image and a fourth image that are corresponding to the first motion vector V, where the first motion vector V is a motion vector of the third image relative to the fourth image, the third image is an image that is in the first video sequence and that is photographed at a second moment, the fourth image is an image that is in the second video sequence and that is photographed at the second moment, and the second moment is a moment preceding the first moment;

perform image registration processing on the first image and the third image to obtain a second motion vector U of the first image relative to the third image;

obtain a third motion vector W of the fourth image relative to the second image; and obtain a registration result according to the first motion vector V, the second motion vector U, and the third motion vector W, where the registration result includes a correspondence between a pixel in the first image and a pixel in the second image.

Optionally, the image registration device is specifically configured to perform image registration processing on the fourth image and the second image by using a global image registration algorithm, to obtain the third motion vector W of the fourth image relative to the second image, or perform inverse processing according to a movement direction included in the second motion vector U, to obtain the third motion vector W.

Optionally, the image registration device is specifically configured to: perform, according to the first motion vector V, the second motion vector U, and the third motion vector W, displacement processing on a first location of each pixel in the first image, to obtain a second location; and obtain the registration result according to the second location, where a pixel in the first location in the first image is corresponding to a pixel in the second location in the second image.

Optionally, the image registration device is further configured to perform image registration processing on the third image and the fourth image by using a local image registration algorithm, to obtain the first motion vector V of the third image relative to the fourth image.

Further, the image registration device is specifically configured to perform image registration processing on the first image and the third image by using the global image registration algorithm, to obtain the second motion vector U of the first image relative to the third image.

Optionally, the image registration device is specifically configured to: after it is determined that a process of image registration processing performed on a fifth image and a sixth image by using an optical flow algorithm or a block matching algorithm ends, perform, by using the optical flow algorithm or the block matching algorithm, image registration processing on a third image and a fourth image that are obtained at an end moment of the process of image registration processing, to obtain the first motion vector V of the third image relative to the fourth image.

The fifth image is an image that is in the first video sequence and that is photographed at a third moment, the sixth image is an image that is in the second video sequence and that is photographed at the third moment, and the third moment is a moment preceding the second moment.

Optionally, there are N frames of images within a time interval between obtaining the third image and the first image, and there are N frames of images within a time interval between obtaining the fourth image and the second image, where N is a positive integer.

Optionally, N is directly proportional to a photographing frame rate of a camera in the terminal.

Another aspect of the embodiments of the present invention provides a storage medium. The storage medium is a computer readable storage medium and stores one or more programs, the one or more programs include an instruction, and when the instruction is executed by a portable electronic device that includes a camera and multiple application programs, the portable electronic device is enabled to execute the image registration method in any one of the foregoing method embodiments. The camera includes a first camera and a second camera.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

In the specification, claims, and accompanying drawings of the present invention, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "include" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The units described as separate parts may or may not be physically separate, and parts displayed as units may or may not be physical units, may be located in one location, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An image registration method for a terminal, comprising:

obtaining a first video sequence photographed by a first camera and a second video sequence photographed by a second camera, wherein the first video sequence and the second video sequence record a same scene, wherein the terminal comprises the first camera and the second camera, and wherein the first camera and the second camera are disposed side by side and working simultaneously;

determining, according to a first image in the first video sequence and photographed at a first moment and a second image in the second video sequence and photographed at the first moment, a first motion vector (V) available at the first moment, and a third image and a fourth image corresponding to the V, wherein the V is a motion vector of the third image relative to the fourth image, wherein the third image is an image in the first video sequence and photographed at a second moment, wherein the fourth image is an image in the second video sequence and photographed at the second moment, and wherein the second moment is a moment preceding the first moment;

performing image registration processing on the first image and the third image to obtain a second motion vector (U) of the first image relative to the third image;

obtaining a third motion vector W of the fourth image relative to the second image; and obtaining a registration result according to the V, the U, and the W, wherein the registration result comprises a correspondence between each pixel in the first image and each pixel in the second image.

2. The method of claim 1, wherein obtaining the W of the fourth image relative to the second image comprises performing the image registration processing on the fourth image and the second image using a global image registration algorithm to obtain the W of the fourth image relative to the second image.

3. The method of claim 1, wherein obtaining the registration result comprises:

performing, according to the V, the U, and the W, displacement processing on a first location of each pixel in the first image to obtain a second location; and obtaining the registration result according to the second location, a pixel in the first location in the first image corresponding to a pixel in a second location in the second image.

4. The method of claim 1, wherein before determining the V available at the first moment, and the third image and the fourth image corresponding to the V, the method further comprises:

performing the image registration processing on the third image and the fourth image using a local image registration algorithm to obtain the V of the third image relative to the fourth image, and performing the image registration processing on the first image and the third image to obtain the U of the first image relative to the third image using a global image registration algorithm to obtain the U of the first image relative to the third image.

5. The method of claim 4, wherein performing the image registration processing on the third image and the fourth image comprises performing, using an optical flow algorithm after a process of the image registration processing performed on a fifth image and a sixth image using the optical flow algorithm ends, the image registration processing on the third image and the fourth image obtained at an end moment of the process of the image registration processing to obtain the V of the third image relative to the fourth image, wherein the fifth image is an image in the first video sequence and photographed at a third moment, wherein the sixth image is an image in the second video sequence and photographed at the third moment, and wherein the third moment is a moment preceding the second moment.

6. The method of claim 4, wherein performing the image registration processing on the third image and the fourth image comprises performing, using a block matching algorithm after a process of the image registration processing performed on a fifth image and a sixth image using the block matching algorithm ends, the image registration processing on the third image and the fourth image obtained at an end moment of the process of the image registration processing to obtain the V of the third image relative to the fourth image, wherein the fifth image is an image in the first video sequence and photographed at a third moment, wherein the sixth image is an image in the second video sequence and photographed at the third moment, and wherein the third moment is a moment preceding the second moment.

7. The method of claim 1, wherein obtaining the W of the fourth image relative to the second image comprises performing inverse processing according to a movement direction comprised in the U to obtain the W.

8. A terminal, comprising:

a first camera;

a second camera disposed side by side with the first camera; and an image registration device coupled to the first camera and the second camera and configured to:

obtain a first video sequence photographed by the first camera and a second video sequence photographed by the second camera, wherein the first video sequence and the second video sequence record a same scene;

determine, according to a first image in the first video sequence and photographed at a first moment and a second image in the second video sequence and photographed at the first moment, a first motion vector (V) available at the first moment, and a third image and a fourth image corresponding to the V, wherein the V is a motion vector of the third image relative to the fourth image, wherein the third image is an image in the first video sequence and photographed at a second moment, wherein the fourth image is an image in the second video sequence and photographed at the second moment, and wherein the second moment is a moment preceding the first moment;

perform image registration processing on the first image and the third image to obtain a second motion vector (U) of the first image relative to the third image;

obtain a third motion vector (W) of the fourth image relative to the second image; and obtain a registration result according to the V, the U, and the W, wherein the registration result comprises a correspondence between a pixel in the first image and a pixel in the second image.

9. The terminal of claim 8, wherein the image registration device is further configured to perform the image registration processing on the fourth image and the second image using a global image registration algorithm to obtain the W of the fourth image relative to the second image.

10. The terminal of claim 8, wherein the image registration device is further configured to:

perform, according to the V, the U, and the W, displacement processing on a first location of each pixel in the first image to obtain a second location; and obtain the registration result according to the second location, a pixel in the first location in the first image corresponding to a pixel in a second location in the second image.

11. The terminal of claim 8, wherein the image registration device is further configured to:

perform the image registration processing on the third image and the fourth image using a local image registration algorithm to obtain the V of the third image relative to the fourth image; and perform the image registration processing on the first image and the third image using a global image registration algorithm to obtain the U of the first image relative to the third image.

12. The terminal of claim 11, wherein the image registration device is further configured to perform, using an optical flow algorithm after a process of the image registration processing performed on a fifth image and a sixth image using the optical flow algorithm ends, the image registration processing on the third image and the fourth image obtained at an end moment of the process of the image registration processing to obtain the V of the third image relative to the fourth image, wherein the fifth image is an image in the first video sequence and photographed at a third moment, wherein the sixth image is an image in the second video sequence and photographed at the third moment, and wherein the third moment is a moment preceding the second moment.

13. The terminal of claim 11, wherein the image registration device is further configured to perform, using a block matching algorithm after a process of the image registration processing performed on a fifth image and a sixth image using the block matching algorithm ends, the image registration processing on the third image and the fourth image obtained at an end moment of the process of the image registration processing to obtain the V of the third image relative to the fourth image, wherein the fifth image is an image in the first video sequence and photographed at a third moment, wherein the sixth image is an image in the second video sequence and photographed at the third moment, and wherein the third moment is a moment preceding the second moment.

14. The terminal of claim 8, wherein the image registration device is further configured to perform inverse processing according to a movement direction comprised in the U to obtain the W.

15. A computer program product comprising computer-executable instructions for storage on a non-transitory computer readable storage medium that, when executed by a processor of a portable electronic device, cause the portable electronic device that comprises a first camera and a second camera to perform operations comprising:

obtaining a first video sequence photographed by the first camera and a second video sequence photographed by the second camera, wherein the first video sequence and the second video sequence record a same scene, wherein the first camera and the second camera are disposed side by side and working simultaneously;

determining, according to a first image in the first video sequence and photographed at a first moment and a second image in the second video sequence and photographed at the first moment, a first motion vector (V) available at the first moment, and a third image and a fourth image corresponding to the V, wherein the V is a motion vector of the third image relative to the fourth image, wherein the third image is an image in the first video sequence and photographed at a second moment, wherein the fourth image is an image in the second video sequence and photographed at the second moment, and wherein the second moment being is a moment preceding the first moment;

performing image registration processing on the first image and the third image to obtain a second motion vector (U) of the first image relative to the third image;

obtaining a third motion vector (W) of the fourth image relative to the second image; and obtaining a registration result according to the V, the U, and the W, wherein the registration result comprises a correspondence between each pixel in the first image and each pixel in the second image.

16. The computer program product of claim 15, wherein obtaining the W of the fourth image relative to the second image comprises performing the image registration processing on the fourth image and the second image using a global image registration algorithm to obtain the W of the fourth image relative to the second image.

17. The computer program product of claim 15, wherein obtaining the registration result comprises:

performing, according to the V, the U, and the W, displacement processing on a first location of each pixel in the first image to obtain a second location; and obtaining the registration result according to the second location, a pixel in the first location in the first image corresponding to a pixel in a second location in the second image.

18. The computer program product of claim 15, wherein before determining the V available at the first moment, and the third image and the fourth image corresponding to the V, the operations further comprise performing the image registration processing on the third image and the fourth image using a local image registration algorithm to obtain the V of the third image relative to the fourth image, and performing the image registration processing on the first image and the third image to obtain the U of the first image relative to the third image comprising performing the image registration processing on the first image and the third image using a global image registration algorithm to obtain the U of the first image relative to the third image.

19. The computer program product of claim 18, wherein performing the image registration processing on the third image and the fourth image comprises performing, using an optical flow algorithm after a process of the image registration processing performed on a fifth image and a sixth image using the optical flow algorithm ends, the image registration processing on the third image and the fourth image obtained at an end moment of the process of the image registration processing to obtain the V of the third image relative to the fourth image, wherein the fifth image is an image in the first video sequence and photographed at a third moment, wherein the sixth image is an image in the second video sequence and photographed at the third moment, and wherein the third moment is a moment preceding the second moment.

20. The computer program product of claim 15, wherein obtaining the W of the fourth image relative to the second image comprises performing inverse processing according to a movement direction comprised in the U to obtain the W.

* * * * *